United States Patent
Nobuyoshi et al.

(10) Patent No.: US 7,062,603 B2
(45) Date of Patent: Jun. 13, 2006

(54) EXTERNAL STORAGE DEVICE FOR SELECTIVELY STORING DATA BETWEEN FIRST AND SECOND RECORDING MEDIA

(75) Inventors: Tanaka Nobuyoshi, Tokio-to (JP); Akihiro Ogura, Kanagawa-ken (JP); Atsuya Takeuchi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 10/298,413

(22) Filed: Nov. 18, 2002

(65) Prior Publication Data

US 2003/0097523 A1  May 22, 2003

(30) Foreign Application Priority Data

Nov. 19, 2001  (JP) ............................... 2001-353775

(51) Int. Cl.
*G06F 12/00* (2006.01)

(52) U.S. Cl. ...................... 711/112; 711/154; 711/156; 711/165

(58) Field of Classification Search ................ 711/112, 711/154, 156, 165
See application file for complete search history.

(56) References Cited

U.S. PATENT DOCUMENTS

| | | | | |
|---|---|---|---|---|
| 5,390,187 A | * | 2/1995 | Stallmo | 714/7 |
| 5,920,646 A | * | 7/1999 | Kamon | 382/173 |
| 6,205,407 B1 | * | 3/2001 | Testa et al. | 702/119 |
| 6,243,315 B1 | * | 6/2001 | Goodman | 365/222 |
| 2001/0029532 A1 | * | 10/2001 | Kato et al. | 709/223 |

FOREIGN PATENT DOCUMENTS

| | | |
|---|---|---|
| JP | 64-082253 | 3/1989 |
| JP | 05-108304 | 4/1993 |
| JP | 06-103128 | 4/1994 |
| JP | 09-297659 | 11/1997 |
| JP | 2001-244021 | 9/2001 |

* cited by examiner

*Primary Examiner*—Stephen C. Elmore
(74) *Attorney, Agent, or Firm*—Robert B. Martin; Dillon & Yudell LLP

(57) ABSTRACT

An external storage device for storing data comprises judgment means and access processing means. The judgment means determines whether or not a specified data pattern can be used as a replacement to record a data block. Namely, judgment means determines that a data block can be recorded by using a specific data pattern when the data block and the data pattern match. The access processing means stores identification information for identifying the specified data pattern used to record the data block rather than storing contents of the data.

4 Claims, 11 Drawing Sheets

| # | COMPRESSION FLAG | HDD FLAG | PATTERN REPLACEMENT FLAG | POSITION INFORMATION (3B) | | |
|---|---|---|---|---|---|---|
| 0 | 1 | 0 | 0 | STORAGE POSITION OF M BLOCK | | |
| 1 | 0 | 0 | 0 | STORAGE POSITION OF M BLOCK | | |
| 2 | don't care | 1 | 0 | don't care | | |
| 3 | don't care | don't care | 1 | IDENTIFICATION INFORMATION 00+5bit | OFFSET INFORMATION 9bit | DATA VALUE 8bit |
| 4 | don't care | don't care | 1 | IDENTIFICATION INFORMATION 01+5bit | rv | FIRST DATA VALUE 8bit | SECOND DATA VALUE 8bit |
| 5 | don't care | don't care | 1 | IDENTIFICATION INFORMATION 10 / rv / DATA VALUE 16bit | | | rv : RESERVED (UNUSED) PORTION

| # | IDENTIFICATION INFORMATION (512B) | DATA PATTERN (512B) | FIRST OFFSET INFORMATION | SECOND OFFSET INFORMATION | NUMBER OF REFERENCES |
|---|---|---|---|---|---|
| 0 | 00 00000 | CC 55 AA 33 ⋯ | — | — | 1 |
| 1 | 00 00001 | 12 56 34 78 ⋯ | — | — | 5 |
| ⋮ | ⋮ | ⋮ | ⋮ | ⋮ | ⋮ |
| 32 | 01 00000 | 99 26 53 6A ⋯ | 128 | 384 | 10 |
| 33 | 01 00001 | 88 FF 63 59 ⋯ | 3 | 92 | 13 |
| ⋮ | ⋮ | ⋮ | ⋮ | ⋮ | ⋮ |

EXTERNAL STORAGE DEVICE FOR SELECTIVELY STORING DATA BETWEEN FIRST AND SECOND RECORDING MEDIA

RELATED PATENT APPLICATION

The present patent application claims priority to co-pending Japanese Application No. 2001-353775, filed on Nov. 19, 2001.

BACKGROUND OF THE INVENTION

1. Technical Field

The present invention relates to storage devices in general, and in particular to an external storage device in a computer network.

2. Description of the Related Art

Hard disks are often used to store data processed by a computer system. Generally speaking, a hard disk has a relatively low cost per bit and a relatively high storage capacity. However, since a hard disk relies upon mechanical actions, such as rotation of a disk or movement of a magnetic head, for reading and writing data, the access speed of the hard disk is much slower than a solid state storage device that is capable of reading and writing data electrically.

It would be desirable to provide an improved external storage device that is capable of storing data efficiently in a cost-effective manner.

SUMMARY OF THE INVENTION

In accordance with a preferred embodiment of the present invention, an external storage device for storing data comprises judgment means and access processing means. The judgment means determines whether or not a specified data pattern can be used to record a data block. Namely, judgment means determines that a data block can be recorded by using a specific data pattern when the data block and the data pattern match. The access processing means stores identification information for identifying the specified data pattern used to record the data block rather than storing contents of the data block.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 5 is a block diagram of a position table used to store data relating to position of blocks in a storage device according to a preferred embodiment of the present invention;

FIG. 7 is a block diagram of a registration table used to store registration data for data blocks stored in the external storage device according to a preferred embodiment of the present invention;

DETAILED DESCRIPTION OF A PREFERRED EMBODIMENT

Figure 1:
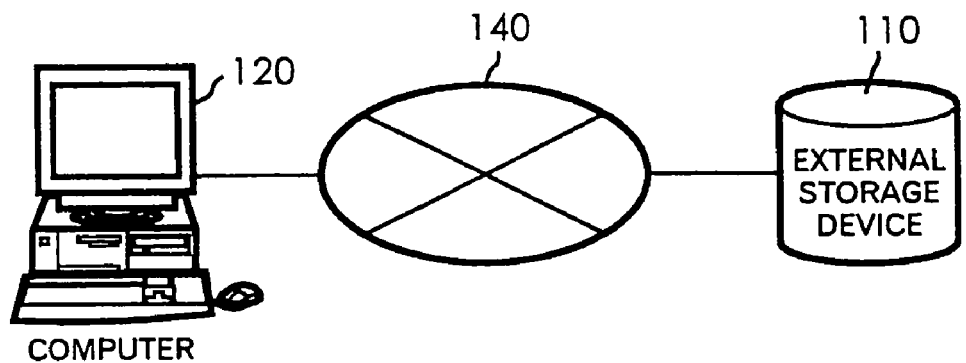
FIG. 1 is a diagram of a computer network configuration according to a preferred embodiment of the present invention.

Referring now to the drawings and, in particular, to FIG. 1, there is illustrated a diagram of a computer network configuration, in accordance with a preferred embodiment of the present invention. As shown, a computer system 100 of the present embodiment includes an external storage device 110, a computer 120, and a network 140. The external storage device 110 stores data blocks obtained by dividing data, such as files, received from an external apparatus such as the computer 120 in block units of a pre-specified length. The external storage device 110 of the present embodiment has a capacity of 16 GB. The external storage device 110 includes a volatile semiconductor memory of 2 GB as a first recording medium, and a nonvolatile recording medium of 14 GB as a second recording medium. The external storage device 110 may use a volatile semiconductor memory such as an SRAM or a DRAM, a nonvolatile semiconductor memory such as a flash memory or an IC card memory, an optical recording medium such as a DVD, a magneto-optical recording medium such as an MD, a magnetic recording medium such as a hard disk, a tape medium, or the like. Generally, the access speed of the second recording medium is lower than the access speed of the first recording medium.

The computer 120 executes a program and accesses the external storage device 110 through the network 140 in accordance with instructions of the program. The network 140 is a local-area network for connecting the external storage device 110 and the computer 120. The network 140 may also be a public line network such as the Internet or telephone line, or various networks by dedicated communication networks such as Server Area Network (SAN). The computer 120 may be directly connected to the external storage device 110 by using IDE connection, E-IDE connection, SCSI connection, USB connection, or fiber channel connection, without using the network 140.

Figure 2:
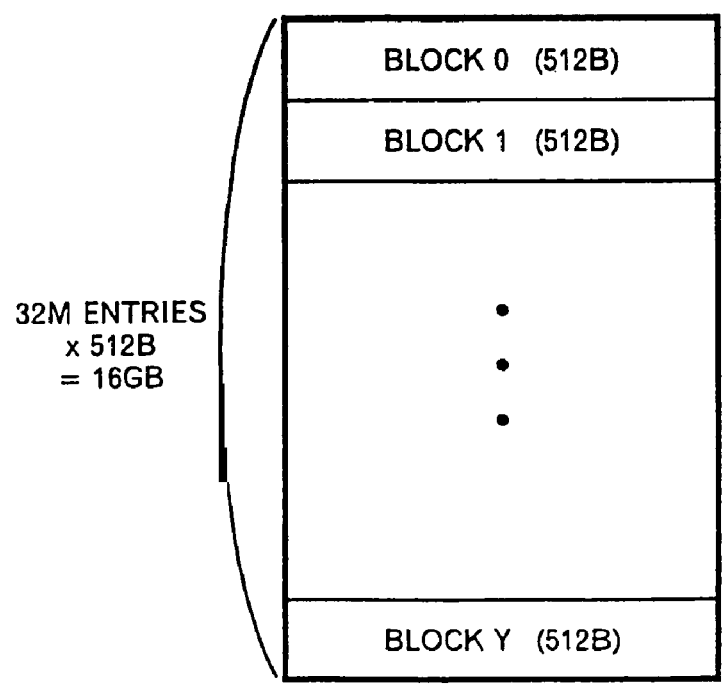
FIG. 2 is a block diagram of a data structure of a storage area provided by an external storage device, according to a preferred embodiment of the present invention.

FIG. 2 shows a data structure of a storage area provided by the external storage device 110 of a preferred embodiment of the present invention. As shown, the external storage device 110 stores data in a block unit of 512 B (byte).

The external storage device 110 may also use other block sizes, such as 256 B, 1024 B, or 2048 B. The computer 120 regards the external storage device 110 as a storage device having a storage capacity of 16 GB (512 byte×32 Mega=16 Giga byte) including 32 M (Mega) blocks of 512 B (byte) and accesses it. On the other hand, in the external storage device 110, a data block storage area used for storing a data block in the first storage recording medium has a storage capacity smaller than the second recording medium.

The computer 120 uses, as an example of an access to the external storage device 110, a write access of writing a data block of 512 B into a specific block in the external storage device 110, a readout access of reading out a data block of 512 B from a specific block in the external storage device 110, and a capacity readout access of requesting readout of capacity information indicating the storage capacity of the external storage device 110. If data of less than 512 B is written into the external storage device 110, the computer 120 causes the write access to include size designation of the data to be written. The external storage device 110 and the computer 120 may support an access in a cluster unit integer times as large as the block in addition to these accesses.

Figure 3:
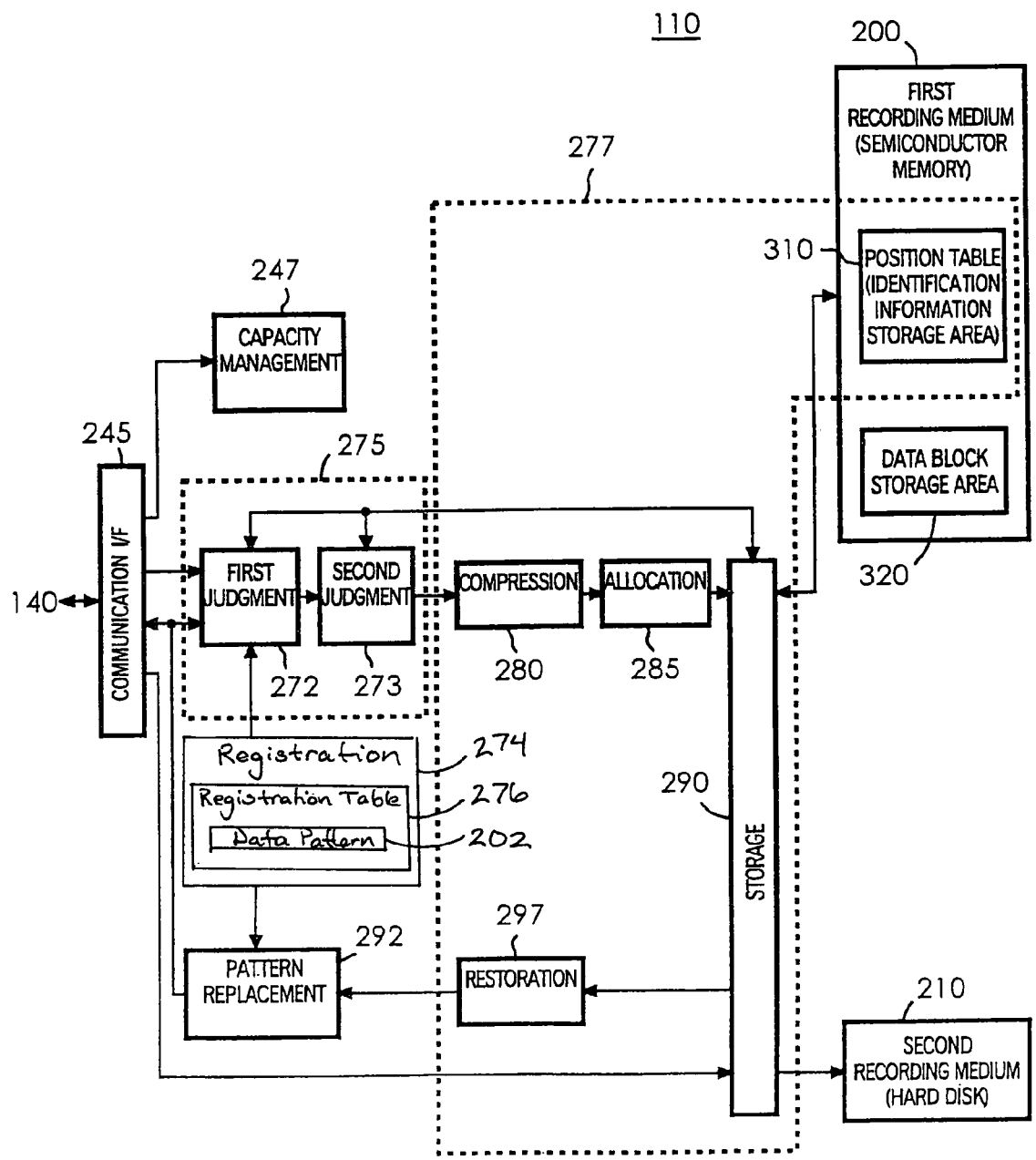
FIG. 3 is a block diagram of an external storage device, according to a preferred embodiment of the present invention.

FIG. 3 shows a structure of the external storage device 110 of a preferred embodiment of the present invention. As shown, the external storage device 110 includes a semiconductor memory 200, a hard disk 210, a communication interface 245, a capacity management module 247, a judgment module 275, a registration module 274, an access processing module 277, and a pattern replacement module 292. The semiconductor memory 200 is an example of the first recording medium of the invention. The hard disk 210 is an example of the second recording medium of the present invention.

The semiconductor memory 200 is a recording medium of a volatile semiconductor memory. In the present embodiment, the semiconductor memory 200 has a capacity of 2 GB. The semiconductor memory 200 includes a position table 310 and an M data block storage area 320. The position table 310 contains 4 B entries each corresponding to a 512 B block (shown in FIG. 2) in the external storage device 110. The M data block storage area 320 is a data area for storing data block contents within the semiconductor memory 200. The M data block storage area 320 of this embodiment divides and stores data received from the computer 120 into 64 B M blocks (memory blocks).

The hard disk 210 is a nonvolatile recording medium. The hard disk 210 of the present embodiment has an access speed lower than the semiconductor memory 200. The hard disk 210 divides data received from the computer 120 into H blocks (hard disk blocks) each being a block of 512 B and stores them. The hard disk 210 has a capacity of 14 GB. The communication interface 245 processes transmission and reception of data to and from the computer 120.

After receiving a capacity readout request from the computer 120 through the network 140, the capacity management module 247 returns capacity information indicating a larger storage capacity than the storage capacity of the M data block storage area 320 to the computer 120. In the depicted embodiment, the capacity management module 247 returns the capacity information indicating the storage capacity of 16 GB, which is larger than the storage capacity of 2 GB of the semiconductor memory 200 to the computer 120.

The capacity information may not be the storage capacity itself but may be a parameter value used for calculation of the storage capacity. The capacity information may be information including, for example, number of blocks, number of sectors, number of tracks, number of cylinders, and/or block size, instead of the storage capacity itself. For example, if the computer 120 is connected to the external storage device 110 through SCSI, the computer 120 may acquire the number of blocks of the external storage device 110 and the block size by using a Read Capacity command as an example of the capacity readout request.

After receiving a data block write request from the computer 120, the judgment module 275 determines the manner in which a write data block, included in the data block write request, should be stored using the position table 310, the M data block storage area 320, and the hard disk 210. The judgment module 275 includes a first judgment module 272 and a second judgment module 273.

The first judgment module 272 first determines whether or not the data block matches a specified data pattern 202 stored in a registration table 276 in the registration module 274. The first judgment module 272 registers the write data block in the registration module 274 and, as explained in further detail below with reference to FIG. 11, enables the write data block to be recorded using the specified data pattern. If it is determined that the specified data pattern 202 can be used to record the write data block, instead of storing the contents of the write data block into the M data block storage area 320 or the hard disk 210, the first judgment module 272 instructs the storage module 290 to store identification information as information to identify the data pattern 202 corresponding to the write data block into the position table 310.

If the first judgment module 272 determines that the specified data pattern cannot be used to record the write data block, the second judgment module 273 determines whether or not the write data block can be stored into the M data block storage area 320 in the semiconductor memory 200. That is, first, the second judgment module 273 determines the number of empty M blocks of the M data block storage area 320 from the storage module 290. Next, if the number of empty M blocks of the semiconductor memory 200 is not less than 8 (or otherwise, not less than the number of M blocks in which the data block can be stored without compression), the second judgment module 273 determines that the object data block can be stored into the M data block storage area 320. Alternatively, the second judgment module 273 may instruct a compression module 280 to compress the data block and subsequently make the foregoing determination based on whether a sufficient number of empty blocks to store the compressed data block exists.

The registration module 274 correlates the data pattern 202 used by the first judgment module 272 with the identification information within position table 310 for identifying the data pattern and registers it. The registration module 274 includes a registration table 276 for registering information such as the data pattern 202 used by the first judgment module 272 and by the pattern replacement module 292. Alternatively, the registration module 274 may store the registration table 276 in the semiconductor memory 200 or the hard disk 210.

The access processing module 277 includes the compression module 280, an allocation module 285, the storage module 290, a restoration module 297, and the position table 310. The compression module 280 compresses the object data block to be stored into the M data block storage area 320 using compression algorithm, for example, run-length coding, Huffman coding, or Lempel-Ziv coding. According to the compression algorithm or the contents of the object data block, there is a case where eight or more M blocks are required to store the compressed object data block, and an effect of compressing the object data block can not be obtained. In such a case, the compression module 280 delivers the object data block to the allocation module 285 without compression. The compression module 280 of the present embodiment does not compress the object data block determined to be stored into the hard disk 210.

The allocation module 285 divides the write data block to be stored into the M data block storage area 320 into M blocks the number of which corresponds to the uncompressed data block size, and allocates the M blocks. That is, the allocation module 285 divides the uncompressed data block of 512 B into eight M blocks of 64 B. On the other hand, the allocation module 285 divides the compressed write data block into M blocks the number of which corresponds to the size after compression. For a request to write a block of less than 512 B, the allocation module 285 divides it into M blocks the number of which is required for storage of the object data block.

The storage module 290 controls access to the semiconductor memory 200 and the hard disk 210. After receiving the instruction from the first judgment module 272 to store the identification information of the write data block into the position table 310, the storage module 290 stores the identification information of the object data block into the position table 310.

Responsive to a determination that the write data block is to be stored in M data block storage area 320, the storage module 290 stores the write data block in the semiconductor memory 200, into one or more M blocks allocated by the allocation module 285. The storage module 290 also handles storing the write data block into the hard disk 210.

After receiving the readout access through the communication interface 245, the storage module 290 reads out the object data block from the position table 310, the M data block storage area 320, or the hard disk 210, and transmits it to the restoration module 297. Specifically, after receiving the readout access, the storage module 290 refers to the position table 310 and determines whether the object data block as the readout object data is stored in the semiconductor memory 200 or the hard disk 210. If the object data block is stored as the identification information in the position table 310, the storage module 290 acquires the identification information corresponding to the object data block from the position table 310, and transfers it to the pattern replacement module 292 through the restoration module 297.

If the object data block is stored in the M data block storage area 320 in the semiconductor memory 200, the storage module 290 reads out the object data block from the M data block storage area 320 in the semiconductor memory 200. On the other hand, if the object data block is stored in the hard disk 210, the storage module 290 reads out the object data block from the hard disk 210. Then, the storage module 290 transfers the object data block to the restoration module 297.

If the object data block of the readout access read out from the M data block storage area 320 in the semiconductor memory 200 is compressed, the restoration module 297 restores the object data block. Then, the restoration module 297 returns the object data block of the readout access to the computer 120 through the pattern replacement module 292. On the other hand, after receiving the identification information corresponding to the object data block from the storage module 290, the restoration module 297 transfers the received identification information to the pattern replacement module 292.

The pattern replacement module 292 acquires the identification information corresponding to the object data block from the storage module 290 through the restoration module 297. Then, the pattern replacement module 292 generates the object data block on the basis of the data pattern corresponding to the acquired identification information. When the identification information specifies the data pattern registered in the registration table 276 in the registration module 274, the pattern replacement module 292 acquires the corresponding data pattern from the registration module 274, and generates the object data block. On the other hand, after receiving the readout object data block from the restoration module 297, the pattern replacement module 292 transfers the readout object data block to the communication interface 245.

Figure 4:
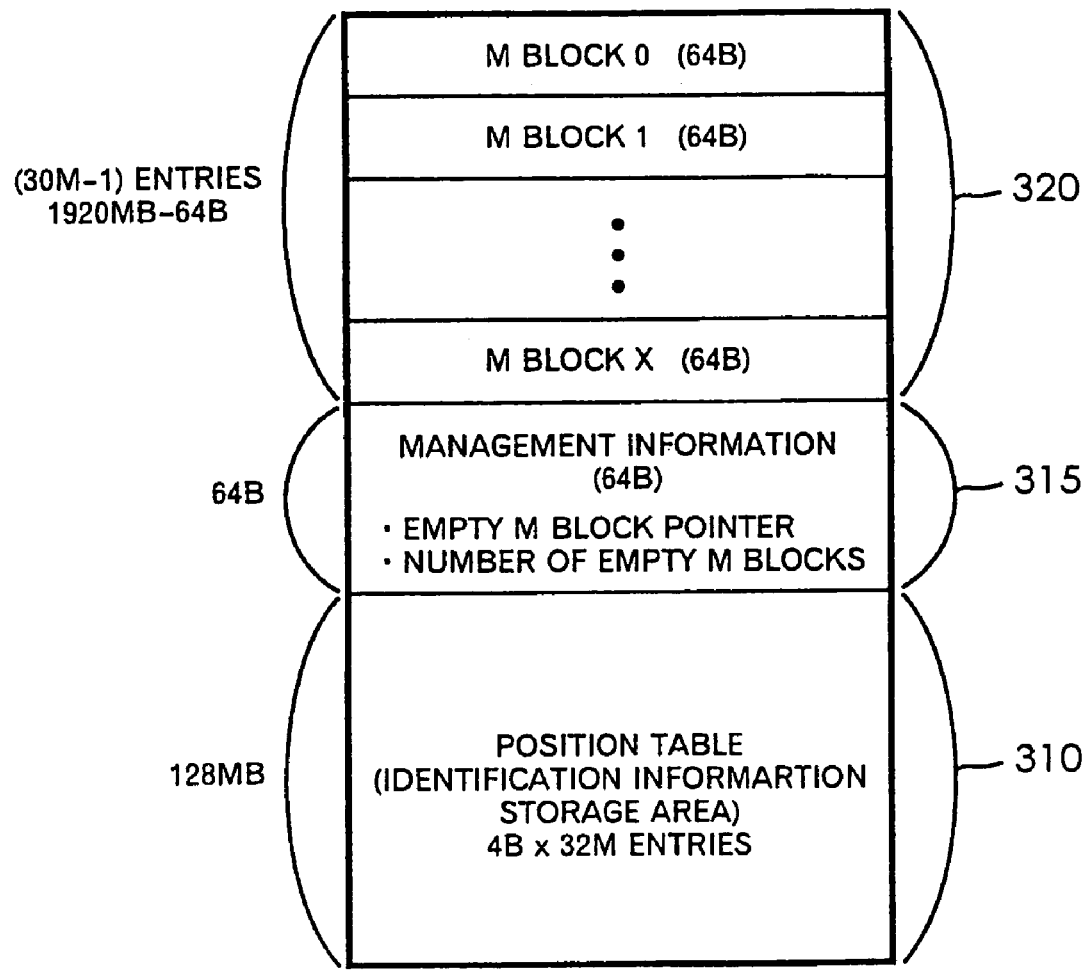
FIG. 4 is a block diagram of a data structure of a semiconductor memory, according to a preferred embodiment of the present invention.

FIG. 4 shows a data structure of the semiconductor memory 200 of a preferred embodiment of the present invention. The semiconductor memory 200 includes the position table 310, management information 315, and the M data block storage area 320. The position table 310 causes information of 4 B indicating a storage position of a data block stored in the external storage device 110 to correspond to each of the blocks of the external storage device 110 shown in FIG. 2 and stores it. The position table 310 includes 32 M entries corresponding to the respective blocks of the external storage device 110, and takes an area size of 128 MB (4 B×32 M entries). The information of 4 B of each entry includes information indicating whether the data block is stored in the M data block storage area 320 in the semiconductor memory 200 or the hard disk 210, information indicating whether the data block is compressed, information indicating whether the data block is recorded using the specified data pattern, and information indicating the number of the M block in which the data block is stored. Alternatively, the storage module 290 may store the position table 310 and/or the management information 315 in a recording medium different from the semiconductor memory 200.

The management information 315 stores management information of 64 B used for managing the external storage device 110. The management information 315 includes an empty M block pointer to indicate an empty M block, and the number of empty M blocks.

The empty M block pointer indicates one of unused M blocks. The storage module 290 stores the unused M blocks in a one-way list form in which the beginning is indicated by the empty M block pointer. That is, the storage module 290 couples the unused M blocks with each other by writing link information indicating the number of a next unused M block into an unused M block and forms a one-way list. Then, the storage module 290 stores the number of the M block positioned at the beginning of the one-way list of the unused M blocks into the empty M block pointer. When writing the object data block into the M data block storage area 320, the storage module 290 may use a necessary number of M blocks from the beginning of the list of the empty M blocks. The storage module 290 may add an M block which becomes unnecessary as the result of writing of the object data block into the semiconductor memory 200 or the hard disk 210, to, for example, the beginning of the list of the empty M blocks. In order to facilitate securement of continuous empty M blocks, the storage module 290 may, for example, periodically rearrange the one-way list of empty M blocks in numerical order of the M blocks. The storage module 290 may, for example, periodically move active M blocks so that empty M blocks are arranged as continuously as possible.

The number of empty M blocks stores the number of unused M blocks. When acquiring an empty M block from the list of empty M blocks or adding an empty M block into the list of empty M blocks, the storage module 290 updates the number of empty M blocks.

Instead of using the storage method of the empty M blocks described above, the management information 315 may store the empty M blocks by using, for example, a method of using a bit map having bits corresponding to the respective M blocks and becoming "1" in the case where the M block is empty.

The M data block storage area 320 is a data area of M blocks stored in the semiconductor memory 200. The M data block storage area 320 is an example of the data block storage area of this invention. The M data block storage area 320 stores (30 M−1) M blocks of 64 B. Accordingly, the area size of the M data block storage area 320 becomes 1920 MB−64 B (30 M×64 B−64 B). The numbers of 0 to X (X=30 M−2) are allocated to the M blocks and they are identified by using the numbers.

FIG. 5 shows an example of the position table 310 of a preferred embodiment of the present invention in a table form. The position table 310 includes respective fields of a compression flag 311, a HDD flag 312, a pattern replacement flag 313, and a position information 314. The HDD flag 312, the pattern replacement flag 313, and the position information 314 are examples of a position information module of this invention.

The compression flag 311 is a field for storing "0" when the object data block is compressed and is not stored, and "1" when it is compressed and is stored. The HDD flag 312 is a field for storing "0" when the object data block is stored in the M data block storage area 320 in the semiconductor memory 200, and "1" when it is stored in the hard disk 210. The pattern replacement flag 313 is a field for storing "1" when the object data block is recorded by using the specified data pattern, and "0" when it is not stored by using the specific data pattern (i.e., when it is stored in the M data block storage area 320 or the hard disk 210).

The position information 314 stores the identification information of the data pattern when the object data block is recorded by using the specific data pattern. When the object data block is stored in one or more M blocks, the position information 314 stores the number of the leading M block. On the other hand, when the object data block is stored in the H block, the object data block is stored in the H block specified by the block number on the position table 310.

As set forth above, the position table 310 stores the identification information of the data pattern corresponding to the object data block or the information indicating the storage position of the object data block, which is made to correspond to each of the object data blocks obtained by dividing the write object data in H block units. That is, when storing the object data block by using the specified data pattern, the storage module 290 stores the identification information of the specified data pattern into the position information 314. On the other hand, when storing the object data block into the M data block storage area 320, the storage module 290 stores, as information indicating the storage position of the object data block, HDD flag="0" (i.e., indicating the inside of the semiconductor memory 200) and the storage position of the M block (the number of the M block) into the position table 310. When storing the object data block into the hard disk 210, the storage module 290 stores, as information indicating the storage position of the object data block, HDD flag="1" (i.e., indicating the corresponding H block in the hard disk 210) into the position table 310.

The storage module 290 stores the object data block by using one of six methods exemplified in respective lines of FIG. 5.

(0) Object Data Block is Compressed and is Stored into the M Data Block Storage Area 320

When the object data block is compressed and is stored into the M data block storage area 320, the storage module 290 sets the compression flag 311 to "1", the HDD flag 312 to "0", the pattern replacement flag 313 to "0", and the position information 314 to the position of the M block on the M data block storage area 320 storing the object data block.

(1) Object Data Block is not Compressed but is Stored into the M Data Block Storage Area When the object data block is not compressed but is stored into the M data block storage area 320, the storage module 290 sets the compression flag 311 to "0", the HDD flag 312 to "0", the pattern replacement flag 313 to "0", and the position information 314 to the position of the M block on the M data block storage area 320 storing the object data block.

(2) Object Data Block is not Compressed but is Stored into the Hard Disk 210

When the object data block is not compressed but is stored into the hard disk 210, the storage module 290 sets the HDD flag 312 to "1" and the pattern replacement flag 313 to "0". When the second judgment module 273 determines that the object data block is stored into the hard disk 210, the allocation module 285 and the storage module 290 store the object data block into the H block specified by the write access. That is, for example, when receiving the write access of writing the object data block into block 3 of the external storage device 110, the allocation module 285 and the storage module 290 store the object data block into the third H block in the hard disk 210.

(3) Object Data Block is Recorded by Using a Specified Data Pattern

When the object data block is recorded by using the specified data pattern, the storage module 290 sets the pattern replacement flag 313 to "1", and the position information 314 to the identification information etc. of the data pattern.

When it is determined that the object data block is coincident with the data pattern of the identification information "00"+5 bit except for a partial data value, the first judgment module 272 selects the third storage form. The storage module 290 causes offset information of 9 bits indicating the position of the incoincident data value in the object data block and the incoincident data value of 1 B to correspond to the identification information of the data pattern and stores them into the position information 314.

When receiving the readout access, first, the pattern replacement module 292 acquires the data pattern corresponding to the identification information from the registration module 274. Then, the pattern replacement module 292 replaces the data at the position specified by the offset information of the position information 314, in the data pattern acquired from the registration module 274, with the data value of the position information 314. As such, the pattern replacement module 292 can generate the object data block on the basis of the information stored in the third storage form.

When this storage form is used, the access processing module 277 can store the object data block different from the data pattern in any 1 B by using the data pattern.

(4) Object Data Block is Recorded by Using a Specified Data Pattern

When it is determined that the object data block is coincident with the data pattern of the identification information "01"+5 bit except for partial data values, the first judgment module 272 selects the fourth storage form. The storage module 290 causes two incoincident data values of 1 B to correspond to the identification information of the data pattern and stores them into the position information 314. The registration table 276 registers two pieces of offset information for specifying the positions of the respective data values in the object data block, which are made to correspond to the data pattern of the identification information "01"+5 bit. Accordingly, the first judgment module 272 can select this storage form in the case where only the data values of the positions specified by the offset information registered in the registration table 276 become incoincident.

After receiving the readout access, the pattern replacement module 292 acquires the data pattern corresponding to the identification information, the first offset information corresponding to the first data value, and the second offset information corresponding to the second data value from the registration module 274. Then, the pattern replacement module 292 replaces, in the data pattern acquired from the registration module 274, the data at the position specified by the first offset information acquired from the registration module 274 with the first data value, and replaces the data at the position specified by the second offset information acquired from the registration module 274 with the second data value. As such, the pattern replacement module 292 can generates the object data block on the basis of the information stored in the fourth storage form.

When this storage form is used, the access processing module 277 can store the object data block different from the data pattern in two data values of 1 B, the positions of which are respectively specified, by using the data pattern.

(5) Object Data Block is Recorded by Using a Specified Data Pattern

When it is determined that the object data block can be recorded by using a data pattern with repetition of a specific data value of 2 B, the first judgment module 272 selects the fifth storage form. The storage module 290 stores "10"+ preliminary field of 14 bits+data value of 2 Bas identification information made to correspond to the data value of 2 B repeated in the data pattern into the position information 314.

After receiving the readout access, the pattern replacement module 292 arranges 256 data values of 2 B acquired from the position information 314 to generate the object data block. As such, the pattern replacement module 292 can generate the object data block on the basis of the information stored in the fifth storage form.

When this storage form is used, the access processing module 277 can store the object data block with the repetition of the specific data value by using the data pattern.

In the respective storage forms, the access processing module 277 stores the information indicating the position of the M data block storage area 320 storing the object data block in the case of (0) and (1), and stores the identification information corresponding to the object data block in the case of (3) to (5) into the position information 314. As such, the access processing module 277 can reduce the storage capacity required for storage of the position table 310, when comparing (0) to (1) and (3) to (5) with the case of storage into separate recording areas.

As described above, the external storage device 110 of this embodiment uses the data value of 1 B as the data value by which the object data block and the data pattern are not coincident with each other. The external storage device 110 of the present embodiment uses the data value of 2 B as the data value used for generating the data pattern with the repetition of the specific data value. The external storage device 110 may use a data value of arbitrary length less than the object data block, such as 4 bit, 4 B or 8 B. In order to suppress the storage capacity of the position table 310, it is desirable that the external storage device 110 uses a data value of such length that the identification information can be stored in the position information 314.

Figure 6:
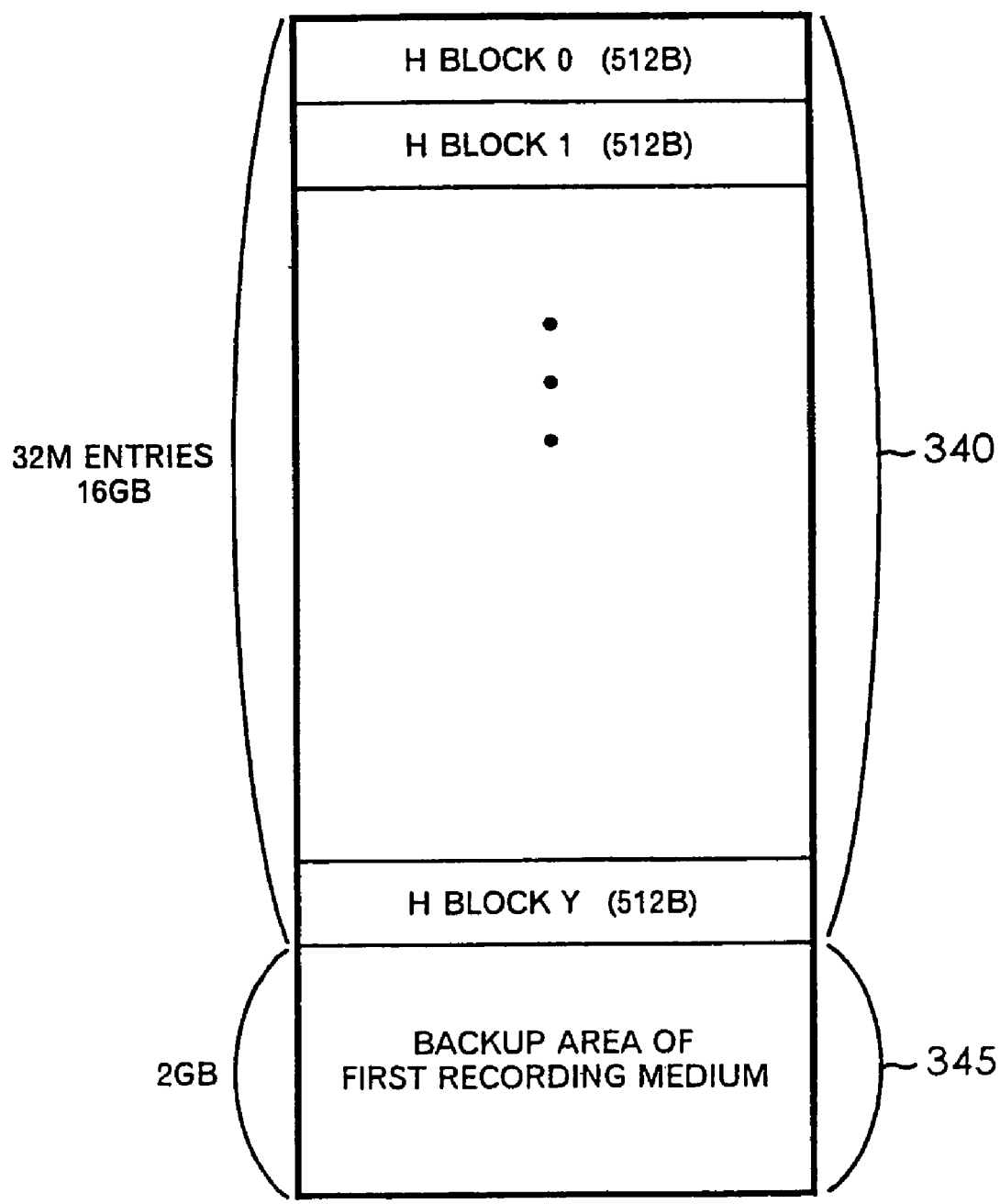
FIG. 6 is a block diagram of a data structure of a hard disk according to a preferred embodiment of the present invention.

FIG. 6 shows a data structure of the hard disk 210 of a preferred embodiment of the present invention. The hard disk 210 includes an H data block storage area 340 and a backup area 345. The H data block storage area 340 is a data area of H blocks stored into the hard disk 210. The H data block storage area 340 stores 32 M H blocks of 512 B. Accordingly, the size of the H data block storage area 340 is 16 GB (32 M×512 B). The numbers of 0 to Y (Y=32 M−1) are allocated to the H blocks, and they are identified by using the numbers. The H data block storage area 340 is an area on the hard disk 210 used for storing the object data block of the write access from the computer 120. The H data block storage area 340 of the present embodiment has the same structure as the data structure of the external storage device 110 shown in FIG. 2. When receiving the capacity readout access from the computer 120, the capacity management module 247 returns the capacity information indicating the capacity of the area of the H data block storage area 340 to the computer 120. Alternatively, the capacity management module 247 may return capacity information indicating the capacity except the area used for management of files stored in the H data block area 340 to the computer 120.

The backup area 345 is an area used for backup of data in the semiconductor memory 200. When the power source of the external storage device 110 is turned OFF, the storage module 290 stores the data of the semiconductor memory 200 into the backup area 345. When the power source of the external storage device 110 is turned ON, the storage module 290 stores the data of the backup area 345 into the semiconductor memory 200.

FIG. 7 shows an example of the registration table 276 of a preferred embodiment of the present invention in a table form. The registration table 276 includes respective fields of identification information, data pattern, first offset information, second offset information, and number of references. The identification information field stores identification information for identifying a data pattern of the line. Alternatively, the registration table 276 may determines identification information corresponding to the line on the basis of a position in the registration table 276.

The data pattern field stores the data pattern of the line. The first offset information and second offset information fields indicate positions of incoincident data values in the object data block, which the first judgment module 272 and the pattern replacement module 292 use in the fourth storage form in FIG. 5.

The field of the number of references indicates the number of object data blocks which the external storage device 110 stores by using the data pattern of the line. When the object data block is stored by using a data pattern registered in the registration table 276, the first judgment module 272 increases the number of references corresponding to the data pattern by one. When the data block stored by using the data pattern registered in the registration table 276 is replaced by a different data block, the first judgment module 272 decreases the number of references corresponding to the data pattern by one.

The first judgment module 272 has a function of registering a write object data block as a new data pattern in the registration module 274, and making the object data block recordable by using the registered data pattern. When the write object data block is registered in the registration module 274, the registration module 274 changes or replaces a line corresponding to a data pattern determined to have the minimum number of references, to or by the data pattern to be registered. As such, the registration module 274 can make a frequently used data pattern remain in the registration table 276.

When the data pattern in the registration module 274 is changed or replaced, the first judgment module 272 causes all blocks using the changed or replaced data pattern to be stored into the M data block storage area 320 or the hard disk 210. That is, the first judgment module 272 searches blocks using the changed or replaced data pattern from the position information 314 in the position table 310. Next, the first judgment module 272 generates the object data block corresponding to the data pattern through the storage module 290 and the pattern replacement module 292, and transmits it to the second judgment module 273. Then, the access processing module 277 stores the generated object data block into the M data block storage area 320 or the hard disk 210 through the compression module 280, the allocation module 285, and the storage module 290. If the generated object data block is stored into the M data block storage area 320, the access processing module 277 performs a similar processing to the case where the object data block of the write access is stored. That is, the access processing module 277 may compress the generated object data block by the compression module 280 to store it into the M data block area 320. Alternatively, the access processing module 277 may store the generated object data block into the M data block area 320 without compression.

Otherwise, the registration module 274 may perform, for example, periodically the above operation so as to cause the number of references of a block using a data pattern having the number of references smaller than a predetermined value to approach 0. As such, it is possible to reduce a processing time in which the first judgment module 272 registers the data pattern in the registration module 274.

Figure 8:
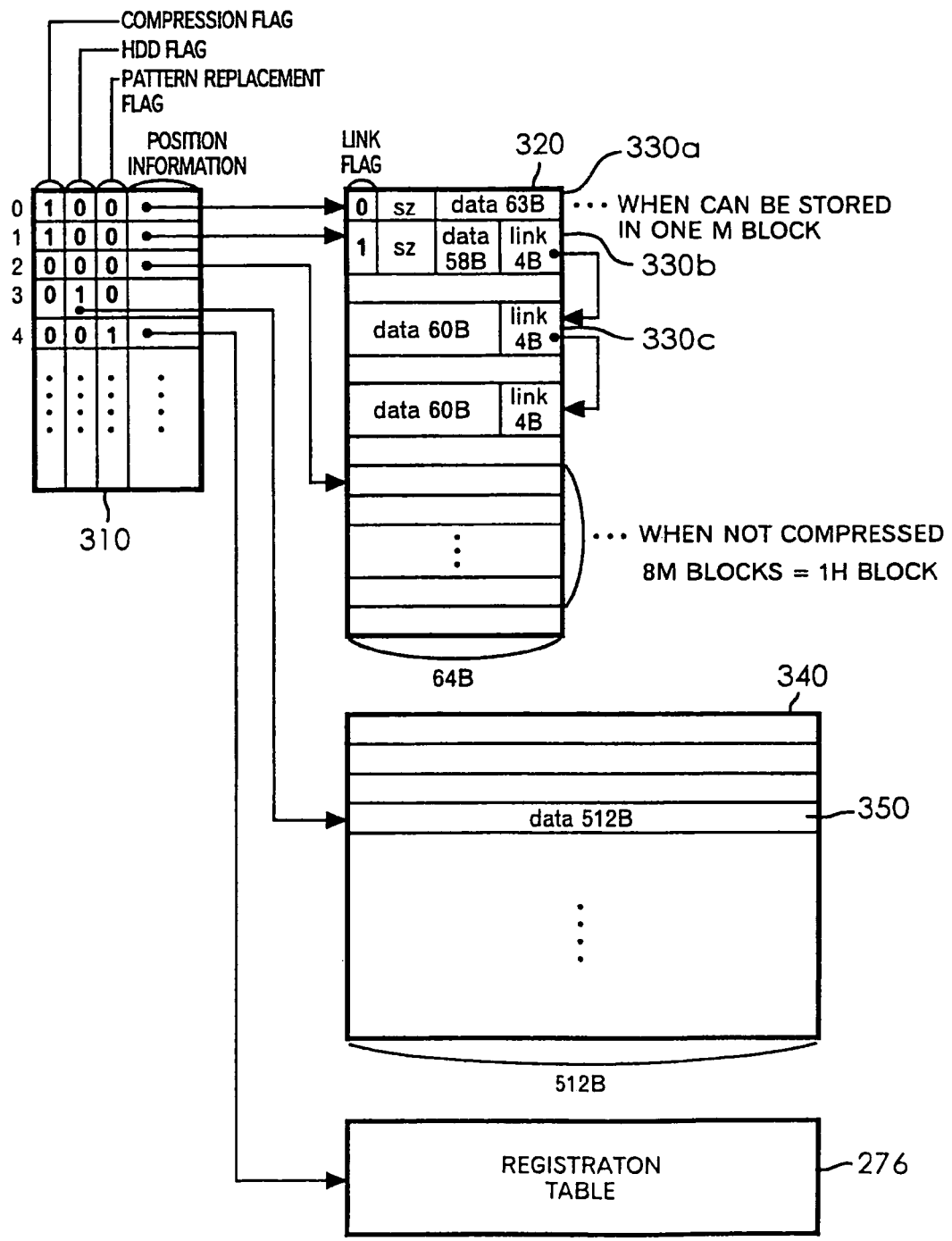
FIG. 8 is an example of a storage form of data stored in the external storage device.

FIG. 8 shows an example of a storage form of data stored in the external storage device 110 of a preferred embodiment of the present invention. The storage module 290 uses one of the six storage methods shown in FIG. 5 to store the object data block. The storage methods (zero and first in FIG. 5) to the M data block storage area 320 can be further divided into three storage methods as described below.

(1-A) Object Data Block is Compressed and is Stored by Using One M Block

When the size of the object data block becomes 63 B or less as the result of compression, the allocation module 285 and the storage module 290 store the object data block by using one M block. The storage module 290 stores the M block in a form shown as an M block 330a.

The M block 330a includes a link flag of 1 bit, a size field of 7 bits, and a data field of 63 B. The link flag is a flag becoming "1" in the case where the M block has link information indicating a subsequent M block. Since the M block 330a has no link information, the leading one bit is "0". The size field (sz in the drawing) indicates a size (0 to 63 B) of the object data block after compression. The data field (data in the drawing) is a storage area of the object data block.

(1-B) Object Data Block is Compressed and is Stored by Using Two or More M Blocks When the size of the object data block becomes 64 B or more as the result of compression, the allocation module 285 and the storage module 290 store the object data block by using two or more M blocks. The storage module 290 stores the M blocks in forms shown as an M block 330b and an M block 330c.

The M block 330b is an M block corresponding to the beginning of the object data block. The M block 330b includes a link flag of 1 bit, a size field of 9 bits, a data field of 58 B, and link information of 4 B. The link flag is a flag similar to the link flag in (1-A). Since the M block 330b has the link information, the leading one bit is "1". The size field (sz in the drawing) indicates the size (0 to 512 B) of the object data block after compression. The data field (data in the drawing) is a storage area of data of the object data block. The link field (link in the drawing) indicates the number of a subsequent M block.

The M block 330c is an M block corresponding to the second or the following of the object data block. The M block 330c includes a data field of 60 B and link information of 4 B. The data field (data in the drawing) is a storage area of the object data block. The link field (link in the drawing) indicates the number of a subsequent M block.

As stated above, when the object data block is stored by using two or more M blocks, the storage module 290 stores the M blocks, the number of which corresponds to the size of the object data block after compression shown in the size field, as a one-way list using the link information. That is, in the case where the object data block is stored into the M data block storage area 320 by using two or more M blocks, the storage module 290 stores the information indicating the position of the first M block for storing the object data block into the position table 310, and stores the link information as the information indicating the position of the subsequent M block of each M block into each of the plural M blocks for storing the object data block.

(2) Object Data Block is not Compressed but is Stored by Using Eight M Blocks

When the compression module 280 did not compress the object data block, the access processing module 277 stores the object data block by using eight continuous M blocks.

Correspondingly to the storage methods (1-A), (1-B) and (2) described above, the storage module 290 and the restoration module 297 read out the object data block by using the following methods.

(1-A) With Respect to a Readout Object Block, Compression Flag=1, HDD Flag=0, and Link Flag=0

The storage module 290 reads out one M block specified by the position information in the position table 310 and corresponding to the readout object block. The restoration module 297 restores the object data block read out by the storage module 290 and transmits it to the computer 120 through the pattern replacement module 292 and the communication interface 245.

(1-B) With Respect to a Readout Object Block, Compression Flag=1, HDD Flag=0, and Link Flag=1

The storage module 290 reads out plural M blocks specified by the position information in the position table 310 and corresponding to the readout object block from the semiconductor memory 200 on the basis of the link information. The restoration module 297 restores the object data block read out by the storage module 290 and transmits it to the computer 120 through the pattern replacement module 292 and the communication interface 245.

(2) With Respect to a Readout Object Block, Compression Flag=0 and HDD Flag=0

The storage module 290 reads out eight continuous M blocks specified by the position information of the position table 310 and corresponding to the readout object block from the semiconductor memory 200. The restoration module 297 transmits the object data block read out by the storage module 290 to the computer 120 through the pattern replacement module 292 and the communication interface 245.

Figure 9:
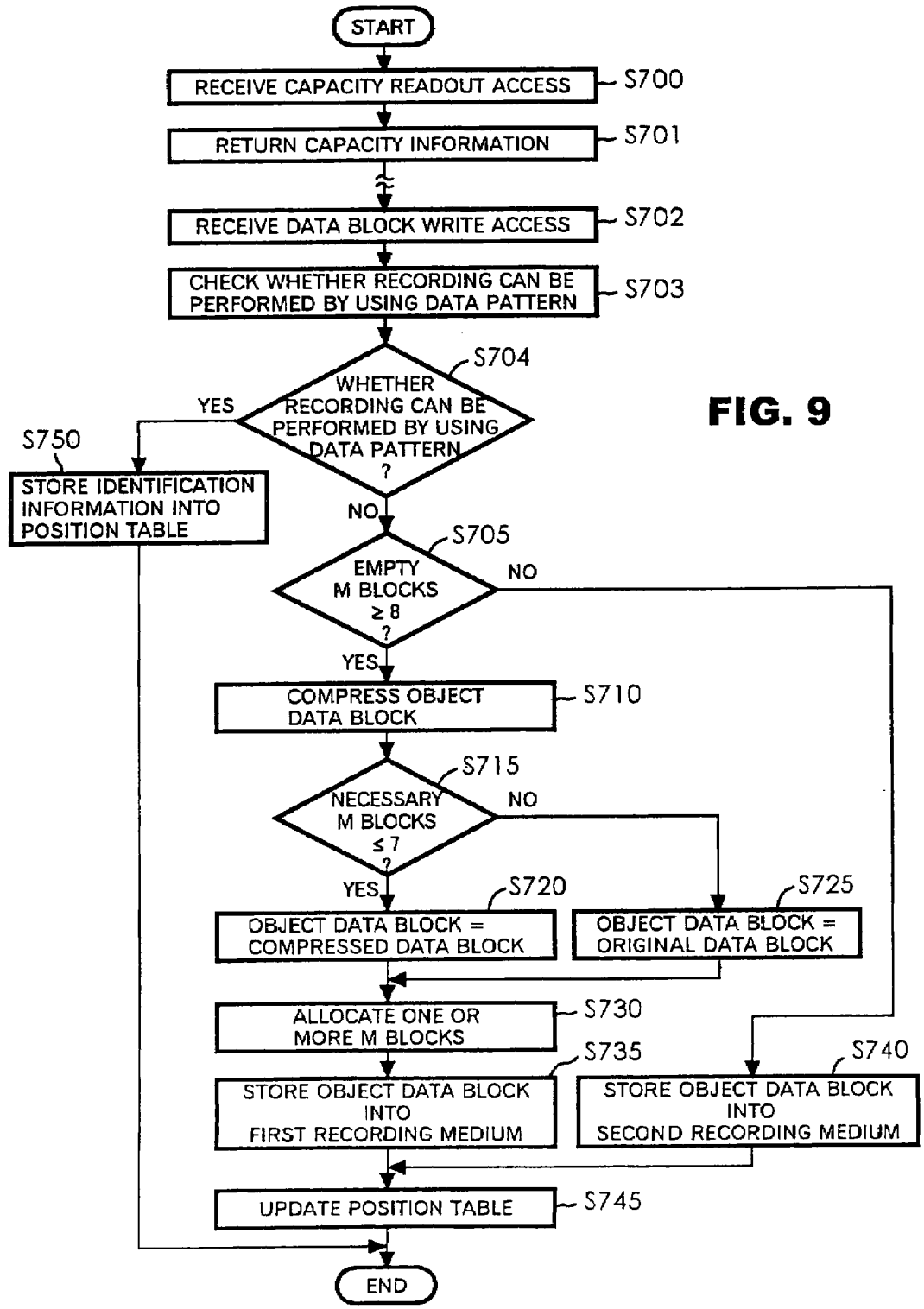
FIG. 9 is a high-level logic flow diagram of a data write process within an external storage device, according to a preferred embodiment of the present invention.

FIG. 9 shows a flow of a data write processing of the external storage device 110 of a preferred embodiment of the present invention. The computer 120 transmits a capacity readout access to the external storage device 110 at, for example, the time of starting or the time of connection of the external storage device 110. The capacity management module 247 receives the capacity readout access through the network 140 and the communication interface 245 (S700). Next, the capacity management module 247 returns the capacity information indicating the storage capacity of the external storage device 110 to the computer 120 (S701).

Next, the judgment module 275 receives a write access from the computer 120 through the network 140 and the communication interface 245 (S702). Next, the first judgment module 275 determines whether or not the object data block can be recorded by using a specified data pattern (S703). When the first judgment module 272 determines that the object data block can be recorded by using the specified data pattern (S704), instead of storing the contents of the object data block into the M data block storage area 320 or the hard disk 210 in the external storage device 110, the access processing module 277 stores identification information etc. of the data pattern into the position table 310 (S750).

If the first judgment module 272 determines that the object data block can not be recorded by using a specified data pattern, the second judgment module 273 determines whether or not the object data block can be stored into the M data block storage area 320. That is, the second judgment module 273 checks whether or not the number of empty M blocks of the M data block storage area 320 is eight or more (S705). If the number of empty M blocks of the M data block storage area 320 is less than eight, the second judgment module 273 determines that the object data block is stored into the hard disk 210. Then, the storage module 290 acquires the object data block through the compression module 280 and the allocation module 285, and stores it into the H block corresponding to the block number specified by the write access from the computer 120 (S740).

Otherwise, if the number of empty M blocks of the M data block storage area 320 is eight or more, the second judgment module 273 determines that the object data block is stored into the M data block storage area 320. Next, the compression module 280 acquires the object data block from the judgment module 275 and compresses it (S710). Next, the compression module 280 determines whether or not the number of M blocks required for storing the compressed object data block is seven or less (S715). When the number of M blocks required for storing the compressed object data block is seven or less, the compression module 280 makes the compressed object data block the object data block to be stored into the semiconductor memory 200 (S720). Otherwise, when the number of M blocks required for storing the compressed object data block is eight or more, the compression module 280 makes the original object data block the object data block to be stored into the M data block storage area 320 (S725).

Next, the allocation module 285 acquires the object data block from the compression module 280, divides it into M blocks the number of which corresponds to the object data block, and allocates these M blocks (S730). Next, the storage module 290 stores the object data block into the M blocks the number of which is allocated by the allocation module 285 (S735). Next, the storage module 290 updates the position table 310 on the basis of the processing content of S735 or S740 (S745).

Figure 10:
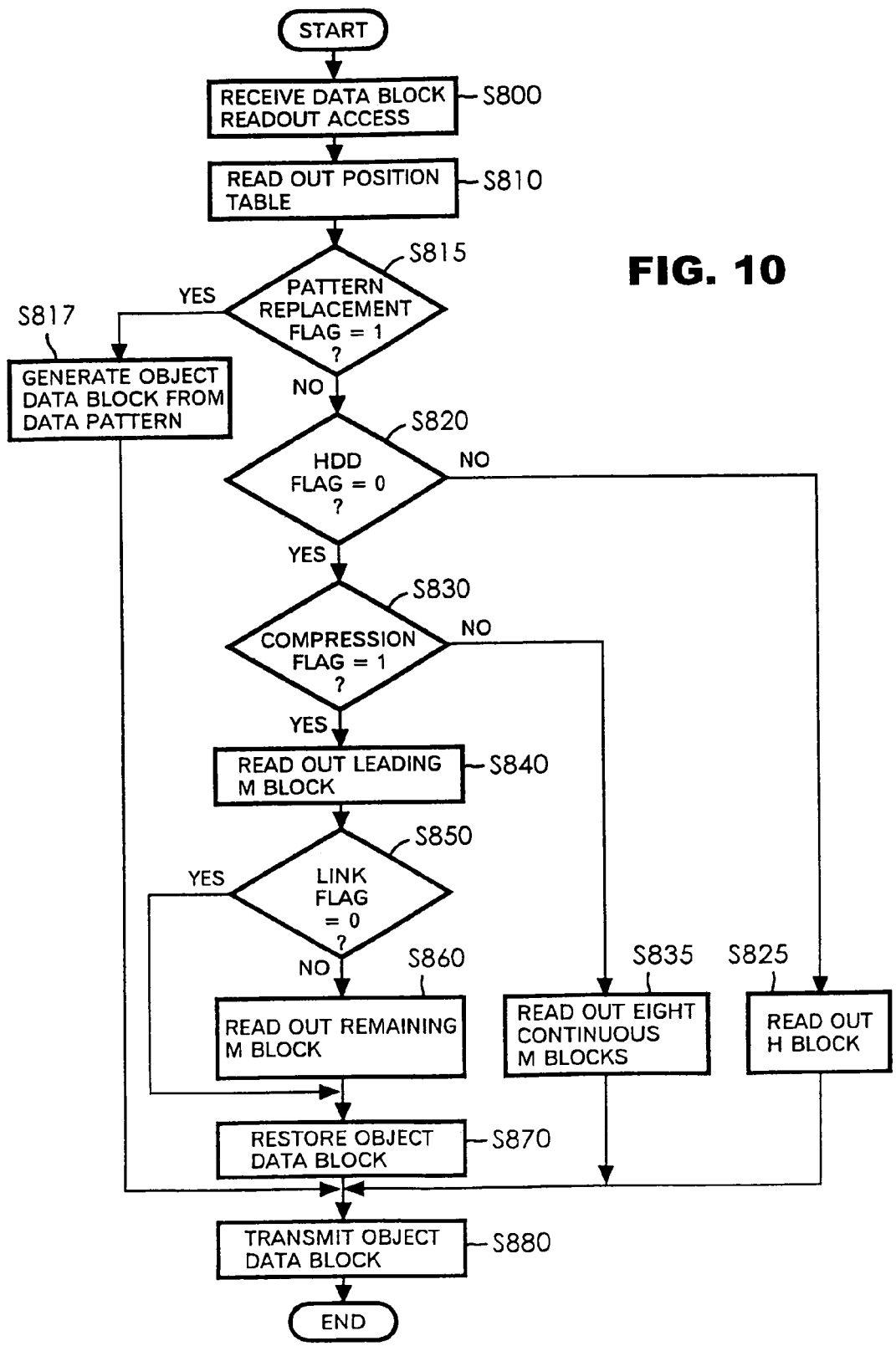
FIG. 10 is a high-level logic flow diagram of a data readout process within an external storage device, according to a preferred embodiment of the present invention.

FIG. 10 is a high-level logic flow diagram of a data readout processing of the external storage device 110 of a preferred embodiment of the present invention. First, the storage module 290 receives a readout access from the computer 120 through the communication interface 245 (S800). Next, the storage module 290 reads out the information indicating the storage position of the object data block of the readout access from the position table 310 on the semiconductor memory 200 (S810).

Next, the storage module 290 determines whether or not the pattern replacement flag concerning the object data block is "1" (S815). When the pattern replacement flag is "1", the storage module 290 transfers information, such as the position information 314, concerning the object data block to the pattern replacement module 292 through the restoration module 297. The pattern replacement module 292 generates the object data block on the basis of the information, such as the position information 314, concerning the object data block (S817), and returns it to the computer 120 through the communication interface 245 (S880).

If the pattern replacement flag is "0" at S815, the storage module 290 determines whether or not the HDD flag concerning the object data block is "0" (S820). If the HDD flag is not "0", the storage module 290 reads out the object data block from the hard disk 210 (S825). Then, the storage module 290 transfers the object data block to the pattern replacement module 292, and causes the pattern replacement module 292 to perform the processing of S880.

If the HDD flag is "0" at S820, the storage module 290 determines whether or not the compression flag concerning the object data block is "1" (S830). If the compression flag is not "1", the storage module 290 reads out eight continuous M blocks specified by the position information from the M data block storage area 320, and acquires the object data block (S835). Then, the storage module 290 transfers the object data block to the pattern replacement module 292 and causes the pattern replacement module 292 to perform the processing of S880.

If the compression flag is "1" at S830, the storage module 290 reads out the leading M block specified by the position information (S840). Then, the storage module 290 determines whether or not the link flag of the leading M block is "0" (S850). If the link flag is "0", the storage module 290 regards the M block acquired at S840 as the object data block and transfers it to the pattern replacement module 292.

If the link flag is "1" at S850, the storage module 290 reads out plural M blocks included in the one-way list on the basis of the size field of the leading M block and the link field of each M block (S860). Then, the storage module 290 regards the plural read out M blocks as the object data block, and transfers them to the pattern replacement module 292. Next, the restoration module 297 restores the object data block transferred from the storage module 290 at S850 or S860 (S870). Next, the pattern replacement module 292 transmits the object data block obtained by performing the processing of S817, S825, S835 or S870 to the computer 120 through the communication interface 245 (S880).

Figure 11:
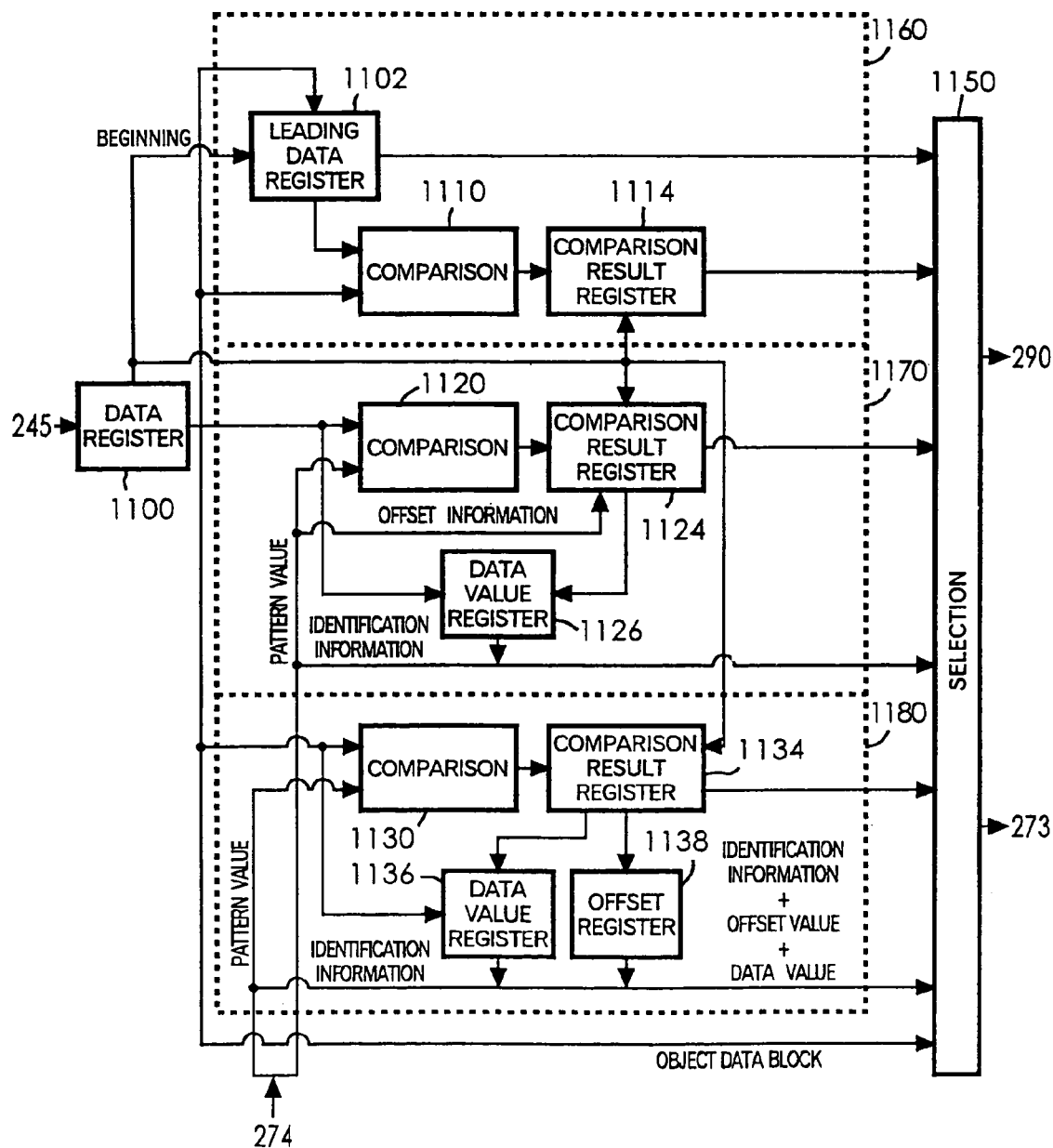
FIG. 11 is a block diagram of a coincidence detection circuit of an object data block and a data pattern, according to a preferred embodiment of the present invention.

FIG. 11 is a block diagram of a match detector circuit, which is included in the first judgment module 272 of a preferred embodiment of the present invention. The match detector circuit includes a data register 1100, a three detection circuits 1160, 1170, and 1180, and a selection module 1150.

The data register 1100 receives each data value of the write data block from the communication interface 245, and outputs it to the detection circuits 1160, 1170, and 1180, and the selection module 1150. The detection circuit 1160 uses a data pattern (leading two bits="10" of the identification information) by repeating a data value of the beginning of the write data block to determine whether the write data block can be recorded. When the write data block and the data pattern (leading two bits="01" of the identification information) match except for two data values of 1 B located at the positions specified by the first and/or second offset information in the registration table 276, the detection circuit 1170 determines that the data pattern can be used to record the write data block. When the write data block and the data pattern (leading two bits="00" of the identification information) match except for a data value of 1 B located at an arbitrary position, the detection circuit 1180 determines that the data pattern can be used to record the write data block. The selection module 1150 thus selects one of the identification information by the detection circuit 1160, the detection circuit 1170, the detection circuit 1180, and the contents of the write data block, which is to be used for storing the object data block.

The coincidence detection circuit B1170 is separately allocated to each of entries of the data patterns (leading two bits="01" of the identification information) which can be registered in the registration table 276. Similarly, the coincidence detection circuit C1180 is separately allocated to each of entries of the data patterns (leading two bits="00" of the identification information) which can be registered in the registration table 276. In FIG. 11, only one typifying them is shown for each of the coincidence detection circuit B1170 and the coincidence detection circuit C1180.

The coincidence detection circuit A1160 includes a leading data register 1102, a comparison arithmetic unit 1110, and a comparison result register 1114. The leading data register 1102 stores the leading data value of the object data block. The comparison arithmetic unit 1110 compares each data value of the object data block in the data register 1100 with the data value of the leading data register 1102. The comparison arithmetic unit 1110 outputs "0" in a coincident case and "1" in an incoincident case at each comparison of the respective data values.

The comparison result register 1114 accumulates the comparison result by the comparison arithmetic unit 1110 for each object data block. That is, the comparison result register 1114 is set to "0" at the point of time when the data register 1110 receives the leading data value of the object data block. Then, the comparison result register 1114 accumulates the output of the comparison arithmetic unit 1110 by an OR operation until the comparison of the whole object data block is ended.

The comparison result register 1114 becomes "1" when a data value in the object data block is incoincident with the leading data register 1102. The coincidence detection circuit A1160 compares the leading data value of the object data block with the respective data values of the object data block. Then, when all of these are coincident with one another, the comparison result register 1114 outputs "0" as information indicating coincidence. The leading data register 1102 outputs "10" as information stored in the position information 314+leading data value.

The coincidence detection circuit B1170 includes a comparison arithmetic unit 1120, a comparison result register 1124, and a data value register 1126.

The comparison arithmetic unit 1120 compares a data value of the object data block in the data register 1100 with a corresponding data value of the data pattern (leading two bits="01" of the identification information) in the registration table 276. The comparison arithmetic unit 1120 outputs "0" in a coincident case and "1" in an incoincident case at each comparison of the respective data values.

The comparison result register 1124 accumulates the comparison result by the comparison arithmetic unit 1120 for each object data block. That is, the comparison result register 1124 is set to "0" at the point of time when the data register 1100 receives the leading data value of the object data block. Then, the comparison result register 1124 accumulates the output of the comparison arithmetic unit 1120 by an OR operation until the comparison of the whole object data block is ended. When the data value under comparison is a data value specified by the first offset information of the registration module 274, the comparison result register 1124 stores the data value of the data register 1100 as a first data value into the data value register 1126. When the data value under comparison is a data value specified by the second offset information of the registration module 274, the comparison result register 1124 stores the data value of the data register 1100 as a second data value into the data value register 1126. When the data value of the data register 1100 is stored into the data value register 1126, the comparison result register 1124 regards the data values under comparison as having been coincident with each other.

The comparison result register 1124 becomes "0" when the object data block and the data pattern are coincident with each other except for two data values of 1 B located at the positions specified by the registration table 276. The coincidence detection circuit B1170 compares the object data block with the data pattern in the registration table 276. Then, in the case where they are coincident with each other except for the data values of the positions specified by the first and second offset information of the registration table 276, the comparison result register 1124 outputs "0" as information indicating coincidence. Besides, the coincidence detection circuit B1170 outputs identification information (leading two bits="01") as information stored in the position information 314+first data value+second data value. The coincidence detection circuit C1180 includes a comparison arithmetic unit 1130, a comparison result register 1134, a data value register 1136, and an offset register 1138.

The comparison arithmetic unit 1130 compares a data value of the object data block in the data register 1100 with a corresponding data value of the data pattern (leading two bits="00" of the identification information) in the registration table 276. The comparison arithmetic unit 1130 outputs "0" in a coincident case and "1" in an incoincident case at each comparison of the respective data values.

The comparison result register 1134 accumulates the comparison result by the comparison arithmetic unit 1130 for each object data block. That is, the comparison result register 1134 is set to "0" at the point of time when the data register 1100 receives the leading data value of the object data block. Then, the comparison result register 1134 accumulates the output of the comparison arithmetic unit 1130 by an OR operation until the comparison of the whole object data block is ended. Here, when the data values are incoincident with each other, the comparison result register 1134 stores the incoincident data value of the data register 1100 into the data value register 1136, and stores the offset information indicating the position of the incoincident data value in the object data block into the offset register 1138. The comparison result register 1124 regards the data values under comparison as having been coincident with each other. Thereafter, when again detecting an incoincident data value concerning the object data block, the comparison result register 1134 sets "1" and records incoincidence.

The comparison result register 1134 becomes "0" when the object data block and the data pattern are coincident with each other except for a data value of 1 B located at an arbitrary position. The coincidence detection circuit C1180 compares the object data block with the data pattern in the registration table 276. Then, if they are coincident with each other except for the data value of 1 B at the arbitrary position, the comparison result register 1134 outputs "0" as information indicating coincidence. The coincidence detection circuit C1180 outputs identification information (leading two bits="00") as information stored in the position information 314+offset information+data value.

When the coincidence detection processing of the object data block by the coincidence detection circuit A1160, the coincidence detection circuit B1170 and the coincidence detection circuit C1180 is ended, the selection module 1150 selects the storage form of the object data block on the basis of the outputs of the comparison result register 1114, the comparison result register 1124 and the comparison result register 1134. That is, in the case where one of the comparison result register 1114, the comparison result register 1124 and the comparison result register 1134 is "0", the selection module 1150 instructs the storage module 290 to store the object data block by using the data pattern detected by one of the coincidence detection circuit A1160, the coincidence detection circuit B1170 and the coincidence detection circuit C1180. Here, at least two of the comparison result register 1114, the comparison result register 1124 and the comparison result register 1134 are "0", the selection module 1150 determines which data pattern is used among those detected by the coincidence detection circuit A1160, the coincidence detection circuit B1170 and the coincidence detection circuit C1180 in accordance with previously determined priority order. On the other hand, in the case where all of the comparison result register 1114, the comparison result register 1124 and the comparison result register 1134 are "1", the selection module 1150 instructs the second judgment module 273 to store the contents of the object data block into the M data block storage area 320 or the hard disk 210.

Figure 12:
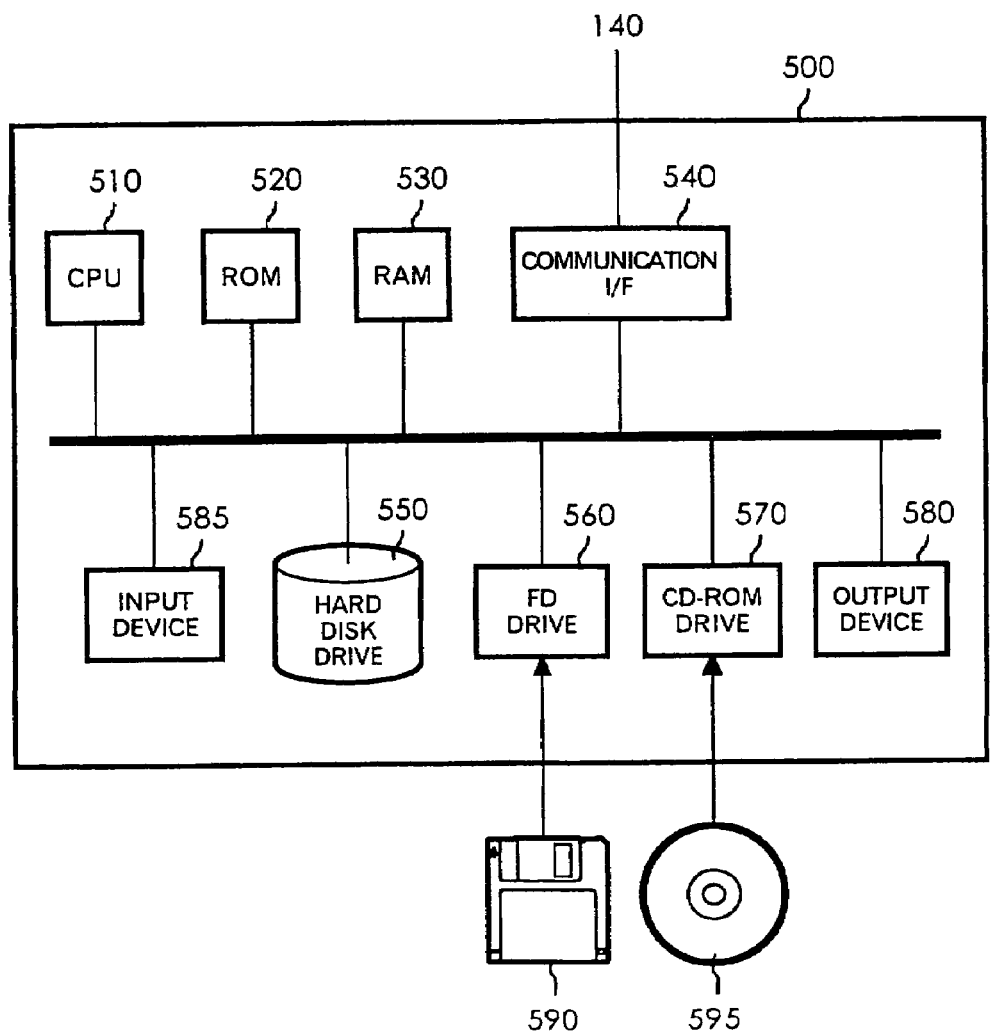
FIG. 12 is a block diagram of a hardware structure of an external storage device, according to a preferred embodiment of the present invention.

FIG. 12 is a block diagram of the external storage device 110 according to a preferred embodiment of the present invention. The functions of the external storage device 110 of the present embodiment are realized by cooperation between a computer 500 including a CPU 510, a ROM 520, a RAM 530, a communication interface 540, a hard disk drive 550, an output device 580 and an input device 585 and a program executed on the computer 500. The computer 500 may further include a floppy disk drive 560 and/or a CD-ROM drive 570.

The program realizing the external storage device 110 includes a communication interface module, a capacity management module, a judgment module, a registration module, an access processing module, and a pattern replacement module. These modules are programs for causing the computer 500 to operate as the communication interface 245, the capacity management module 247, the judgment module 275, the registration module 274, the access processing module 277, and the pattern replacement module 292. The judgment module includes a first judgment module and a second judgment module. These modules are programs for causing the computer 500 to operate as the first judgment module 272 and the second judgment module 273. The access processing module includes a compression module, an allocation module, a storage module, and a restoration module. These modules are programs for causing the computer 500 to operate as the compression module 280, the allocation module 285, the storage module 290, and the restoration module 297. The RAM 530 and the hard disk drive 550 may be used as the recording medium for storing the contents of the semiconductor memory 200 and the hard disk 210.

The programs or modules described above may be stored in an external storage medium. As the recording medium, in addition to the floppy disk 590 and the CD-ROM 595, an optical recording medium such as a DVD or a PD, a magneto-optical recording medium such as an MD, a tape medium, or a semiconductor memory such as an IC card can be used. In addition, a storage device, such as a hard disk or a RAM, provided in a server system connected to a dedicated communication network or the Internet may be used to provide the program to the computer 500 through the network 140 or the network connected to the computer 120.

According to the external storage device 110 of the present embodiment, it is possible to provide the storage device of the combination of the semiconductor memory 200 with the relatively small capacity and the hard disk 210 with the relatively large capacity. Such an external storage device can be accessed as a large capacity hard disk with a specific storage capacity from an external computer or the like. On the other hand, since many data blocks stored into the external storage device are compressed and stored into the semiconductor memory 200, the external storage device 110 can realize an access speed close to the semiconductor memory 200.

According to the external storage device 110 of the present embodiment, the object data block can be stored into the position information 314 in the position table 310 by using the specified data pattern. With respect to the object data block stored into the position information 314 in the position table 310 by using the specified data pattern, the external storage device 110 can record the contents of the data without storing them into the M data block storage area 320 or the hard disc 210.

When initializing data or data for a file system management area is written in the external storage device 110, the computer 120 or the like often writes data blocks having the same or substantially the same contents into many blocks of the external storage device 110. In this case, instead of storing the data blocks having the same or the substantially the same contents into many M blocks, the external storage device 110 of this embodiment stores the identification information etc. of the data patterns corresponding to these data blocks into the position information 314 in the position table 310. As a result, according to the external storage device 110 of this embodiment, the number of data blocks stored into the M data block storage area 320 at initialization can be reduced. Accordingly, the external storage device 110 can store more data blocks on the semiconductor memory 200, and can realize an access speed close to the semiconductor memory 200.

When the function of storing the object data block by using the specified data pattern is not provided, the external storage device stores each of the data blocks for initialization into one or more M blocks in the M data block storage area at initialization. As a result, at the point of time when initialization is completed, all M blocks in the M data block storage area are used for storing the data blocks for initialization. Thus, the external storage device can not allocate more M blocks than the number stored as initialization data to each of the object data blocks of write accesses received later, and writes the object data blocks into the hard disk at a certain ratio. Accordingly, when the function of storing the object data block by using the data pattern is not provided, the external storage device receives the influence of the data blocks for initialization and reduces the average access speed of a newly written data block.

On the other hand, the external storage device 110 of the present embodiment can store almost all the data blocks for initialization into the position information 314 by using the specified data patterns. Thus, the external storage device 110 can made the M data block storage area 320 almost unused at the point of time when initialization is completed, and can store the object data block of the write access received later into the M data block storage area 320. Accordingly, since the external storage device 110 of this embodiment does not store a newly written data block into the hard disk 210 until the M data block storage area 320 is filled, the access speed can be kept high.

The external storage device 110 of the present embodiment can acquire the data block stored in the position information 314 in the position table 310 by reading out the position table 310 only once. On the other hand, the external storage device 110 acquires the storage position of the object data block by reading out the position table 310 once, and then, reads out the M data block storage area 320 at least once to acquire the object data block. Thus, by storing part of data blocks into the position information 314 in the position table 310 by using the specified data pattern, the average access speed of the semiconductor memory 200 can be raised.

The external storage device 110 of the present embodiment provides the method of storing the object data block by using the semiconductor memory 200 and the hard disk 210 different from each other in the block size. As such, the external storage device 110 can store the object data block after selecting whether it is to be stored into M blocks the number of which corresponds to the contents of the object data block or into one H block. For example, if the access speed of the semiconductor memory 200 is equal to that of the hard disk 210, this function produces an effect to raise the use efficiency of the storage area by storing data of less than 512 B at an end of a file into the semiconductor memory 200 with priority.

As described above, the external storage device 110 of the present invention realizes the function suitable for using the external storage device having a recording medium of a semiconductor memory as a substitution of an external storage device having a recording medium of a hard disk. The external storage device 110 of the present embodiment has both the feature of the hard disk and the feature of the semiconductor memory.

While the invention has been particularly shown and described with reference to a preferred embodiment, it will be understood by those skilled in the art that various changes in form and detail may be made therein without departing from the spirit and scope of the invention.

What is claimed is:

1. An external storage device, comprising:
    judgment means for determining whether or not a specified data pattern stored within said external storage device can be used as a replacement to record a data block contained in a data write request received by the external storage device; and
    access processing means for storing identification information for identifying said specified data pattern when using said specified data pattern as a replacement to record said data block within an external storage device.

2. The external storage device of claim 1, wherein said judgment means determines that said data block can be recorded by using said data pattern when said data block and the data pattern match.

3. The external storage device of claim 1, wherein said judgment means comprises:
    first judgment means for:
        determining whether or not a specified data pattern can be used as a replacement to record a data block; and
        responsive to determining that the specified data pattern can be used as a replacement to record a data block instructing a storage module to store the identification information that identifies the specified data pattern in correspondence to the data block in a position table.

4. An external storage device, comprising:
    a first recording medium;
    a second recording medium having an access speed lower than said first recording medium;
    a first judgment module, responsive to a request for said data block to be written to said external storage device, for determining whether or not a specified data pattern stored within said external storage device can be used as a replacement to record said data block;
    a second judgment module, responsive to a determination that the specified data pattern cannot be used as a replacement to record said data block, for determining whether or not said data block can be stored into said first recording medium; and
    an access processing module, responsive to said first judgment part determining that the specified data pattern can be used as a replacement to record said data block for, when said second judgment part determines that said data block can be stored into said first recording medium, storing said data block into a data block storage area in said first recording medium, and for, if said second judgment part determines that said data block cannot be stored into said first recording medium, storing said data block into said second recording medium.

* * * * *